(12) United States Patent
White

(10) Patent No.: US 6,446,813 B1
(45) Date of Patent: Sep. 10, 2002

(54) SORTING WASTE MATERIALS

(76) Inventor: Roger White, Newmarket Skip Hire, Station Road, Fordham, Ely, Cambridgeshire, CB7 5LW (GB)

( * ) Notice: Subject to any disclaimer, the term of this patent is extended or adjusted under 35 U.S.C. 154(b) by 0 days.

(21) Appl. No.: 09/381,135
(22) PCT Filed: Mar. 20, 1998
(86) PCT No.: PCT/GB98/00854
§ 371 (c)(1), (2), (4) Date: Nov. 23, 1999
(87) PCT Pub. No.: WO98/42455
PCT Pub. Date: Oct. 1, 1998

(30) Foreign Application Priority Data

Mar. 21, 1997 (GB) ............................................. 9705874

(51) Int. Cl.⁷ .............................. B07B 1/42; B07B 1/28
(52) U.S. Cl. ................................ 209/365.4; 209/365.1; 209/233; 209/311; 209/312; 209/315; 209/317; 209/318; 209/930; 209/931; 209/932
(58) Field of Search ................................ 209/233, 311, 209/312, 315, 317, 318, 365.4, 320, 321, 930, 931, 932

(56) References Cited

U.S. PATENT DOCUMENTS

| | | | | |
|---|---|---|---|---|
| 3,759,380 A | * | 9/1973 | Mathews | 209/22 |
| 3,954,604 A | * | 5/1976 | Krause et al. | |
| 4,319,990 A | * | 3/1982 | Muller | |
| 4,715,950 A | * | 12/1987 | Danner et al. | 209/20 |

* cited by examiner

Primary Examiner—Donald P. Walsh
Assistant Examiner—Jonathan R. Miller
(74) Attorney, Agent, or Firm—Townsend and Townsend and Crew LLP

(57) ABSTRACT

From one aspect the invention is a method of classifying waste materials comprising arranging two sieve screens, each having an inlet end and an outlet end, one above the other to define a space there between, arranging the upper screen, to be of coarser mesh size than the lower screen, supplying waste material to be classified to the inlet end of the upper screen, vibrating the screens, and blowing air between the screens from the inlet end and towards the outlet end whereby the waste material being blown away from the outlet ends of the screens, and large heavy material falling under gravity from the outlet end of the upper screen, and separately collecting the separated waste material fractions. From another aspect the invention is an apparatus for carrying out the method described above.

17 Claims, 2 Drawing Sheets

SORTING WASTE MATERIALS

TECHNICAL FIELD

The invention relates to the sorting of waste materials and more particularly to a method and apparatus for classifying waste materials.

More particularly, but not exclusively, the invention relates to the sorting of waste materials of the kind normally encountered in skips hired f or domestic use. Such waste materials often comprise a mixture of earth from gardens, brick and concrete rubble from small building works, wood, scrap metal and general household refuse including paper, light plastics packaging and broken glass. The nature of such skip waste is usually very different from that of household garbage which can be expected to be lighter in weight and to contain more wet vegetable and the like matter.

It is among the objects of the invention to provide a classifier and a classifying method particularly suited to the sorting of skip waste for recycling.

DISCLOSURE OF INVENTION

According to the invention a method of classifying waste materials comprises arranging two sieve screens, each having an inlet end and an outlet end, one above the other to define a space therebetween, the upper screen being of more coarse mesh size than the lower, supplying waste material to be classified to the inlet end of the upper screen, vibrating the screens, and blowing air between the screens from the inlet end and towards the outlet end, whereby the waste material is separated into a plurality of fractions with fine material passing downwards through the lower screen under gravity, light material being blown away from the outlet ends of the screen, and large heavy material falling under gravity from the outlet end of the upper screen, and collecting the separated waste material fractions. The blown air is preferably of low pressure and high volume.

Preferably the method comprises inclining the upper and lower screens downwardly towards the outlet end.

The method may comprise agitating a portion of the upper screen relatively vigorously, e.g. in a manner such that the addition of the specified portion has a greater frequency and/or amplitude of vibration that that of the remainder of the upper screen. The portion may be a portion of the upper screen adjacent to the inlet.

The method may comprise blowing air between the screens and inclined towards the outlet end from one or more positions intermediate the inlet and outlet ends. The air blown between the screens from one or more intermediate positions is preferably of relatively high pressure and of high volume.

The method may comprise the further steps of re-sieving the large heavy waste fraction to divide the fraction into larger and smaller components, and separately collecting the larger and smaller heavy waste components.

The method may comprise the step of blowing air upwardly and in a direction away from the outlet ends of the upper and lower screens from a position adjacent to the said outlets to assist separation of the light material from the large heavy material fraction.

From another aspect the invention is apparatus for classifying waste materials comprising two sieve screens each having an inlet end and an outlet end arranged one above the other to define a space therebetween, the upper screen being of relatively coarse mesh compared to the lower screen, means for vibrating the screens and air blower means for blowing air into the space between the screens from the inlet end of the screens and towards the outlet ends, whereby waste material can be separated into a plurality of fractions with fine material passing downwards under gravity through the lower screen, light material being blown away from the outlet ends of the screens and large heavy material falling under gravity from the outlet end of the upper screen. The air is preferably blown substantially parallel to the screen surfaces. At least one additional air blower may be positioned between the inlet and outlet ends of the screens and inclined towards the screen outlet ends to assist in blowing 'lights' e.g. paper, plastics, wood and the like, away from the outlet ends of the screens for collection elsewhere.

The first said blower may be of low pressure and high volume. The said additional blower(s) may be of higher pressure and high volume.

The pair of screens may be inclined downwardly towards the outlet ends.

Waste materials to be classified may be supplied to the inlet end of the upper screen by a hopper, chute or the like, or may be batch fed to the apparatus. A speed adjustable conveyor may be utilised to feed material from the chute or hopper to the screen inlet. A collection means for fine heavies, e.g. earth, may be disposed below the screens. The means may comprise a conveyor. Means, e.g. a conveyor or the like, may be positioned at the downstream end of the screens for removing coarse heavies, e.g. builders rubble.

If desired a third screen may be positioned below the outlets of said pair of screens, to divide the large heavy waste fraction into larger and smaller components. A fan may be positioned between the third screen and the said outlets and arranged to blow air upwardly and away from the outlets to assist in separating light waste material from the large heavy fraction.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
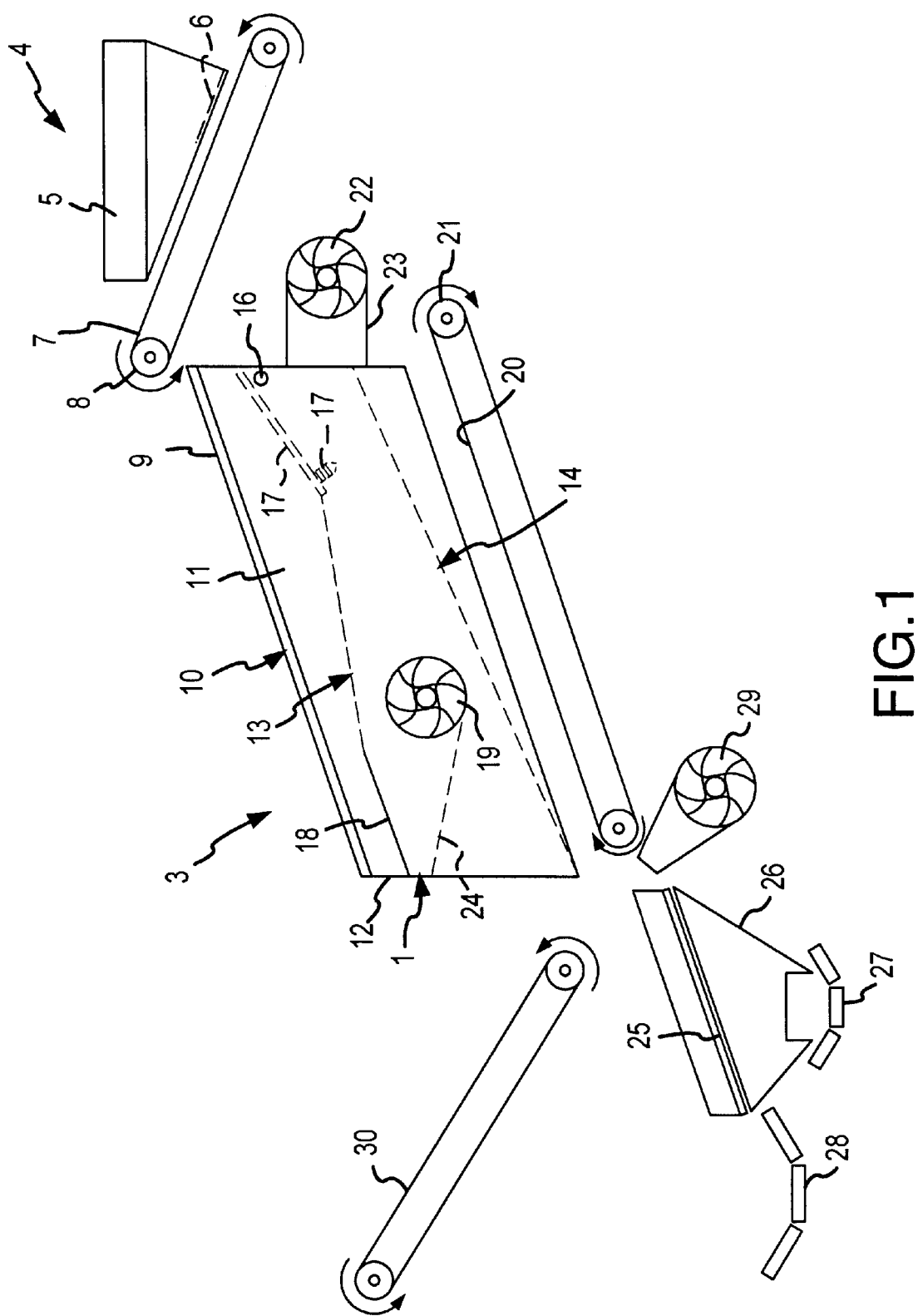
FIG. 1 is a side view of apparatus for classifying waste materials according to the invention.
Figure 2:
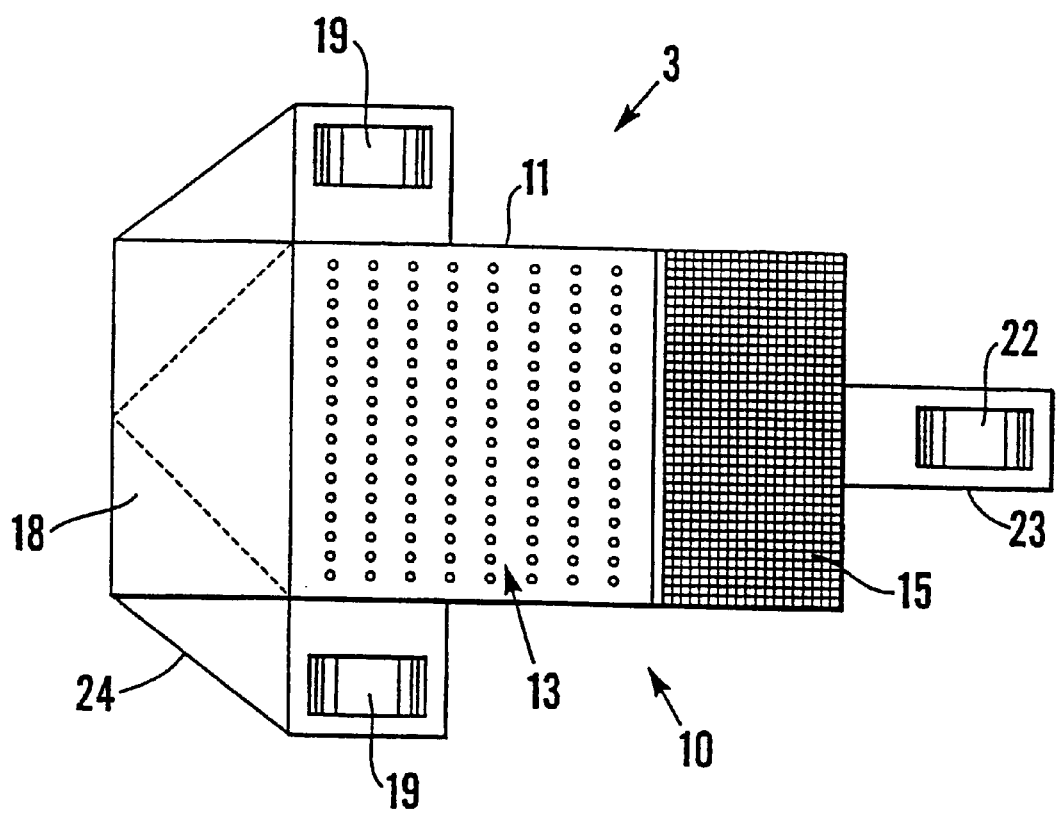
FIG. 2 is a plan view of part of the apparatus shown in FIG. 1.

In the drawings there is shown an apparatus (3) for classifying waste materials, more particularly of the kind typically found in waste collection skips hired for domestic use, such waste materials typically comprising a mixture of garden earth, brick and concrete rubble, timber, scrap metal and general household refuse including paper, light plastics packaging and broken glass.

The apparatus comprises waste reception station (4) in the form of an open-topped hopper (5) into which the waste material is placed by means of suitable mechanical handling means (not shown), e.g. a vehicle equipped with a loading shovel. The hopper has an opening (6) (shown dotted) in its base and through which the waste material is fed onto an endless conveyor (7), e.g. a belt conveyor, positioned adjacent to the opening (6) in the hopper. The speed of the conveyor is adjustable to vary its feed rate as appropriate and is inclined upwardly towards its discharge end (8) to lift the waste into the inlet end (9) of a sieve screening device (10) comprising a housing (11) which is inclined downwardly from the inlet end (9) toward its outlet end (12).

The housing contains a generally parallel pair of sieve screens (13,14) disposed one above the other, the upper screen being disposed near to the top of the housing and the lower screen being disposed near to the bottom of the housing. The housing is arranged to be vibrated by means (not shown) which are known per se to vibrate the screens during use to enhance the screening efficiency.

The lower screen (14) is of finer mesh than the upper screen. The upper screen (13) has a first section (15) adjacent to the inlet end (9) which is relatively coarse compared to the remainder of the upper screen and which is mounted for pivotal movement at its end adjacent to the inlet end about a generally horizontal axle (16) extending transversely of the apparatus. The downstream end of the first section (15) is resiliently mounted on springs (17) to amplify the vibrating motion of the screen section (15).

The first section (15) of the upper screen (13) is arranged to be inclined downwardly to a greater extent than the remainder of the upper screen which is terminated at its outlet end by the plate-like ducting (18) of a pair of fans (19), more fully described below. The lower screen (14) is arranged to discharge through the open bottom of the housing onto an endless conveyor (20), e.g. a belt conveyor, disposed below and running generally parallel with the lower screen, and which is inclined upwardly towards it discharge end (21). The conveyor discharges into a suitable collection receptacle (not shown).

A high volume low pressure fan (22) is mounted at the inlet end of the housing and is provided with ducting (23) which discharges air between the upper and lower screens (13, 14) and directed towards the outlet end (12) of the housing. Towards the outlet end of the housing and on opposite sides are mounted respective high pressure high volume fans (19) which discharge air into ducts (24) whereby the air is directed towards the outlet end of the housing (1). An upper part (18) of the ducts forms the said plate-like downstream extension of the upper screen (13) which terminates at the outlet end of the housing.

The upper and lower screen in the housing are arranged to discharge onto a third vibrating screen (25) which is of coarse mesh, and which is spring mounted and downwardly inclined. Below the third screen is a hopper (26) arranged to direct material passing through the screen onto a transversely extending endless conveyor (27) which discharges into a suitable collection receptacle (not shown). Material passing over the screen (25) is collected on a second transversely extending endless conveyor (28) which discharges into a suitable collection receptacle (not shown).

A medium pressure medium volume fan (29) is arranged between the lower end of the upwardly inclined conveyor (20) and the third vibrating screen (25) to discharge air upwardly to assist in separating light waste components from large heavy waste components falling from the upper and lower screen outlets and to help direct the light component onto an upwardly inclined conveyor (30) positioned beyond the outlet end (12) of the housing for discharge into a suitable receptacle (not shown). The angle of inclination of the conveyor (30) may be adjustable by means (not shown) as dictated by operating conditions.

In operation waste material to be classified is fed into the hopper (5) in any suitable manner, e.g. by means of a loading shovel, from which hopper it is conveyed into the inlet (9) of the sieve screen device (10) where it falls onto the upper vibrating screen (13). Large waste components such as timber, rubble and lighter or large components such as paper and plastics material will be conveyed by the upper vibrating screen to the outlet end as (12) where large and heavy waste components such as rubble fall under gravity onto the third vibrating screen (25) positioned below the housing, while the large lighter components such as paper, plastics and timber are blown by the respective fans onto the upwardly inclined conveyor (30) for separate collection. Small waste components falling through the upper screen fall on the lower screen (14) where they are re-sieved. Fine material e.g. soil passing through the lower screen (14) falls onto the upwardly inclined conveyor (20) on which it is carried to a suitable receptacle. Coarser components travel down the lower screen (14) and discharge onto the third screen (25) where they are re-sieved. Coarse material, e.g. brick rubble passing over the third screen (25) passes to the conveyor (28) and finer material, small rubble, passing through the sieve (25) passes via the hopper (26) onto the conveyor (27). The larger and smaller heavy components are thus conveyed to suitable separate collection points.

INDUSTRIAL APPLICABILITY

The invention thus provides a relatively simple mechanism for classifying waste materials.

What is claimed is:

1. A method of classifying waste materials comprising arranging two sieve screens, each having an inlet end and an outlet end, one above the other to define a space therebetween, arranging the upper screen to be of coarser mesh size than the lower screen, supplying waste material to be classified to the inlet end of the upper screen, vibrating the screens, and blowing air between the screens from the inlet end and towards the outlet end whereby the waste material is separated into a plurality of fractions with fine material passing downwards through the lower screen under gravity, light material being blown away from the outlet ends of the screens, and large heavy material falling under gravity from the outlet end of the upper screen, and separately collecting the separated waste materials fractions, characterized by agitating a portion of the upper screen adjacent the inlet relatively vigorously as compared to the remainder of the upper screen, said portion being relatively coarse as compared to the remainder of the upper screen.

2. A method according to claim 1, comprising inclining the screens downwardly towards their outlet ends.

3. A method according to claim 1, comprising additionally blowing air from a side into a duct positioned downstream of the upper screen which additional air is directed towards the outlet end.

4. A method according to claim 3, wherein the additional air blown into said duct is of higher pressure than the air blown from the inlet end.

5. A method according to claim 1, comprising the step of re-sieving the large heavy waste fraction from the upper and lower screens to divide the fraction into larger and smaller components, and separately collecting the larger and smaller heavy waste components.

6. A method according to claim 1, comprising the step of blowing air upwardly and in a direction away from the outlet ends of the upper and lower screens from a position adjacent to the said outlets to assist separation of the light material fraction from the large heavy material fraction.

7. A method according to claim 6, comprising directing the upwardly blow air to intercept waste material issuing from the outlet ends of the upper and lower screens to assist separation of light waste components from large heavy waste components.

8. Apparatus for classifying waste materials comprising two sieve screens each having an inlet end and an outlet end arranged one above the other to define a space therebetween, the upper screen being of relatively coarse mesh compared to the lower screen, means for vibrating the screens and a primary air blower means for blowing air in the space between the screens from the inlet end of the screens and towards the outlet ends whereby waste material can be separated into a plurality of fractions with fine material passing downwards under gravity through the lower screen, light material being blown away from the outlet ends of the screens and large heavy material falling under gravity from the outlet end of the upper screen, characterized in that the upper screen has a portion adjacent the inlet which is relatively coarse and operable to be agitated relatively vigorously as compared to the remainder of the upper screen.

9. Apparatus according to claim 8, comprising means whereby the air is blown substantially parallel to the upper and lower screens.

10. Apparatus according to claim 8, comprising at least one additional air blower positioned on a side of the apparatus arranged to direct air into a duct downstream of the upper screen, towards the said screen outlet ends to assist in blowing light waste components to the screen outlet ends.

11. Apparatus according to claim 10, wherein the a additional blower(s) is (are) of higher pressure than the primary air blower means.

12. Apparatus according to claim 8, wherein the upper and lower screens are inclined downwardly towards the outlet ends.

13. Apparatus according to claim 8, wherein waste material to be classified is supplied to the inlet end of the upper screen by a hopper and via a variable speed conveyor.

14. Apparatus according to claim 8, wherein a collection conveyor for fine heavies is disposed below the lower screen.

15. Apparatus according to claim 8, comprising sieve means positioned at the outlet ends of the upper and lower screens to receive waste material passing over the upper and lower screens to separate smaller and larger heavy waste components.

16. Apparatus according to claim 8, comprising a fan positioned beyond the said upper and lower screen outlets and arranged to blow air upwardly and away from the said outlets to assist in separating light waste components from heavy components falling from the upper and lower screen outlets.

17. Apparatus according to claim 8, comprising an upwardly inclined conveyor positioned beyond the upper and lower screen outlets for receiving light waste components and for conveying the light waste material to a collection point.

* * * * *